US012778036B2

(12) United States Patent
Wanta

(10) Patent No.: US 12,778,036 B2
(45) Date of Patent: Nov. 3, 2026

(54) PROVIDING IRRIGATION CONTROL VIA GEOFENCING

(71) Applicant: Textron Innovations Inc., Providence, RI (US)

(72) Inventor: Brian David Wanta, North Augusta, SC (US)

(73) Assignee: Textron Innovations Inc., Providence, RI (US)

( * ) Notice: Subject to any disclaimer, the term of this patent is extended or adjusted under 35 U.S.C. 154(b) by 500 days.

(21) Appl. No.: 18/209,076

(22) Filed: Jun. 13, 2023

(65) Prior Publication Data

US 2024/0415080 A1 Dec. 19, 2024

(51) Int. Cl.

| | |
|---|---|
| ***A01G 25/16*** | (2006.01) |
| ***H04W 4/02*** | (2018.01) |
| ***H04W 4/021*** | (2018.01) |

(52) U.S. Cl.

CPC ............ *A01G 25/16* (2013.01); *H04W 4/021* (2013.01)

(58) Field of Classification Search

CPC .............................. A01G 25/16; H04W 4/021

See application file for complete search history.

(56) References Cited

U.S. PATENT DOCUMENTS

| | | | | |
|---|---|---|---|---|
| 6,298,285 | B1 | 10/2001 | Addink et al. | |
| 6,598,900 | B2 * | 7/2003 | Stanley ............. | B60R 21/01534 701/45 |
| 6,947,811 | B2 | 9/2005 | Addink et al. | |
| 6,997,642 | B2 | 2/2006 | Bishop, Jr. | |
| 7,191,955 | B2 | 3/2007 | Ivans | |
| 7,203,576 | B1 * | 4/2007 | Wilson ................. | A01G 25/165 405/52 |
| 7,349,763 | B2 | 3/2008 | Ivans | |
| 7,458,521 | B2 | 12/2008 | Ivans | |
| 7,617,992 | B2 | 11/2009 | Ivans | |
| 7,708,206 | B2 | 5/2010 | Ivans | |
| 7,822,511 | B2 | 10/2010 | Ivans | |
| 8,322,072 | B2 | 12/2012 | Anderson | |
| 8,739,830 | B2 | 6/2014 | Bradbury et al. | |
| 9,149,013 | B2 | 10/2015 | Andrews | |

(Continued)

FOREIGN PATENT DOCUMENTS

| | | |
|---|---|---|
| CN | 206866257 U | 1/2018 |
| CN | 112119731 A | 12/2020 |

(Continued)

OTHER PUBLICATIONS

PCT/US2024/022197 Notification of Transmittal of the International Search Report and the Written Opinion of the International Searching Authority, or the Declaration, dated Jul. 12, 2024; 12 pages.

*Primary Examiner* — Mark A Connolly

(74) *Attorney, Agent, or Firm* — BainwoodHuang

(57) ABSTRACT

Techniques are directed to controlling a set of irrigation heads. Such techniques involve initiating an irrigation task that directs the set of irrigation heads to irrigate at least a portion of a geographic area defined by a virtual boundary. Such techniques further involve electronically detecting presence of a device within the geographic area defined by the virtual boundary. Such techniques further involve suspending the irrigation task in response to electronically detecting the presence of the device within the geographic area defined by the virtual boundary.

21 Claims, 8 Drawing Sheets

(56) References Cited

U.S. PATENT DOCUMENTS

| | | | | |
|---|---|---|---|---|
| 9,480,209 | B2 | 11/2016 | Pfrenger et al. | |
| 9,717,191 | B2 | 8/2017 | Endrizzi et al. | |
| 9,829,871 | B1 * | 11/2017 | Goodman | A01G 25/167 |
| 9,955,636 | B2 | 5/2018 | Wherley et al. | |
| 10,194,598 | B2 | 2/2019 | Bauman et al. | |
| 10,231,391 | B2 | 3/2019 | Standerfer et al. | |
| 10,306,844 | B1 | 6/2019 | Levine | |
| 10,448,585 | B2 | 10/2019 | Kundra et al. | |
| 10,512,226 | B2 | 12/2019 | Lankford | |
| 10,631,476 | B2 | 4/2020 | Bauman et al. | |
| 10,721,881 | B1 | 7/2020 | Fischman | |
| 10,941,548 | B2 * | 3/2021 | Sawaski | G01V 3/00 |
| 11,071,262 | B2 | 7/2021 | Fischman | |
| 11,178,829 | B2 | 11/2021 | Cline et al. | |
| 11,185,024 | B2 | 11/2021 | Larsen | |
| 11,190,901 | B1 * | 11/2021 | Makkiya | H04W 4/022 |
| 11,382,286 | B2 | 7/2022 | Anderson et al. | |
| 11,399,475 | B2 | 8/2022 | Eng et al. | |
| 2003/0182022 | A1 | 9/2003 | Addink et al. | |
| 2004/0015270 | A1 | 1/2004 | Addink et al. | |
| 2004/0090329 | A1 | 5/2004 | Hitt | |
| 2004/0217189 | A1 | 11/2004 | Regli | |
| 2005/0082382 | A1 * | 4/2005 | Evelyn-Veere | A01G 25/167 239/69 |
| 2006/0043208 | A1 * | 3/2006 | Graham | A01G 25/16 239/69 |
| 2009/0099701 | A1 | 4/2009 | Li et al. | |
| 2010/0017970 | A1 | 1/2010 | Okada et al. | |
| 2011/0049260 | A1 | 3/2011 | Palmer et al. | |
| 2012/0267447 | A1 | 10/2012 | Abts | |
| 2014/0039695 | A1 | 2/2014 | Andrews | |
| 2015/0081115 | A1 | 3/2015 | Endrizzi et al. | |
| 2015/0081116 | A1 | 3/2015 | Endrizzi et al. | |
| 2021/0204496 | A1 | 7/2021 | Andrade et al. | |
| 2022/0132756 | A1 | 5/2022 | Miller | |
| 2022/0394944 | A1 * | 12/2022 | Eng | A01G 25/167 |
| 2025/0148436 | A1 * | 5/2025 | Rathod | G06Q 30/04 |

FOREIGN PATENT DOCUMENTS

| | | | | |
|---|---|---|---|---|
| CN | 112119886 | A | 12/2020 | |
| CN | 215074427 | U | 12/2021 | |
| DE | 102017128675 | B4 | 11/2021 | |
| EP | 2622419 | | 8/2013 | |
| FR | 2855369 | B1 | 1/2007 | |
| HU | 187542 | B | 1/1986 | |
| KR | 20220034588 | A | 3/2022 | |
| RU | 2387127 | C1 | 4/2010 | |
| WO | 03081362 | A1 | 10/2003 | |
| WO | 2005069988 | | 8/2005 | |
| WO | WO-2018227235 | A1 * | 12/2018 | H02J 13/00004 |

* cited by examiner 300 230 310 320

| | Task Identifier Field 322 | Task Description Field 324 | Geofenced Area Field 326 | Start Time Field 328 | Irrigation Length Field 330 | Current Status Field 332 | Remaining Irrigation Time Field 334 | Other Field(s) 336 |
|---|---|---|---|---|---|---|---|---|
| 310(1) | 001 | Morning - Fairway for Hole #1 | A | 10:00 AM | 20 Minutes | Completed | - | ... |
| 310(2) | 002 | Afternoon - Fairway for Hole #1 | A | 2:00 PM | 15 Minutes | Running | 5 Minutes | ... |
| 310(3) | 003 | Evening - Fairway for Hole #1 | A | 7:00 PM | 15 Minutes | Ready | - | ... |
| | 005 | Morning - Green for Hole #2 | M | 10:00 AM | 15 Minutes | Completed | - | ... |
| ... | ... | ... | ... | ... | ... | ... | ... | ... |
| 310(n) | 011 | Afternoon - Back Fairway for Hole #2 | X | 2:00 PM | 15 Minutes | Suspended | 12 Minutes | ... |
| | 015 | Morning - Fairway for Hole #4 | T | 9:00 AM | 15 Minutes | Completed | - | ... |
| ... | ... | ... | ... | ... | ... | ... | ... | ... |
| 232 | 023 | Afternoon - Green for Hole #6 | K | 3:00 PM | 10 Minutes | Ready | - | ... |
| | ... | ... | ... | ... | ... | ... | ... | ... |

FIG. 3

PROVIDING IRRIGATION CONTROL VIA GEOFENCING

BACKGROUND

A conventional sprinkler system for a golf course includes a network of sprinklers distributed around the holes of the golf course. Individual parts of the conventional golf course sprinkler system may be turned on and off separately by the golf course maintenance crew.

A typical golf course runs such a sprinkler system during the day. Such operation prevents the golf course from drying and wilting.

SUMMARY

It should be understood that there are deficiencies to the above-described conventional golf course sprinkler system. For example, since the typical golf course runs its sprinkler system during the day, often times this results in golfers on the course attempting to avoid active sprinklers. Unfortunately, this results in slower pace of play and worsens the golfer experience.

Additionally, the members of the golf course maintenance crew must manually monitor where groups of golfers are on the course and make decisions to turn the individual parts of the sprinkler system on and off. Such use of human judgment must be based on the maintenance crew's understanding of where the sprinklers are located on particular golf course holes, how long they need to run the sprinklers without wasting water, and their estimates of how much time they have before new groups of golfers reach the particular golf course holes, among other things. Accordingly, successful daytime golf course sprinkler system operation relies a large maintenance crew which is well-trained, knows the particular golf course holes, and has good experience/judgment. Moreover, since the golfers know they are being watched by the maintenance crew, the golfers nevertheless may feel uncomfortable, rushed and frustrated thus again worsening the golfer experience.

In contrast to the above-described conventional approach to operating a golf course sprinkler system, improved techniques are directed to providing irrigation control via geofencing. Such techniques may involve initiating an irrigation task in which a set of irrigation heads operates in a geofenced area (e.g., a geographic area defined by a virtual boundary) and then suspending the irrigation task when a specialized device is detected within the geofenced area (e.g., by a golfer carrying the specialized device, by a golf cart with the specialized device onboard, etc.). Such geofencing may utilize one or more wireless technologies such as the global positioning system (GPS) infrastructure, Bluetooth beaconing, other radio frequency (RF) mechanisms, combinations thereof, and so on. In some arrangements, suspending the irrigation task may involve operating (e.g., closing) a set of valves that delivers water to a particular golf course area (e.g., part of a golf course fairway, part of a putting green, etc.) to prevent interference with various golfer activity. In some arrangements, such techniques involve resuming the irrigation task once the specialized device is no longer within the geofenced area. Moreover, such techniques may start, pause, and resume timers to precisely control irrigation without wasting water. Accordingly, such techniques provide reliability and flexibility, as well as alleviate the need for a large maintenance crew to monitor and apply judgment over irrigation.

One embodiment is directed to a method of controlling a set of irrigation heads. The method includes initiating an irrigation task that directs the set of irrigation heads to irrigate at least a portion of a geographic area defined by a virtual boundary. The method further includes electronically detecting presence of a device within the geographic area defined by the virtual boundary. the method further includes suspending the irrigation task in response to electronically detecting the presence of the device within the geographic area defined by the virtual boundary.

Another embodiment is directed to electronic circuitry to control a set of irrigation heads. The electronic circuitry includes an interface and a controller coupled with the interface. The controller is constructed and arranged to perform a method of:

(A) initiating, through the interface, an irrigation task that directs the set of irrigation heads to irrigate at least a portion of a geographic area defined by a virtual boundary;

(B) electronically detecting, through the interface, presence of a device within the geographic area defined by the virtual boundary; and (C) suspending, through the interface, the irrigation task in response to electronically detecting the presence of the device within the geographic area defined by the virtual boundary.

Yet another embodiment is directed to a computer program product having a non-transitory computer readable medium which controls a set of irrigation heads. The set of instructions, when carried out by computerized circuitry, causes the computerized circuitry to perform a method of:

(A) initiating an irrigation task that directs the set of irrigation heads to irrigate at least a portion of a geographic area defined by a virtual boundary;

(B) electronically detecting presence of a device within the geographic area defined by the virtual boundary; and (C) suspending the irrigation task in response to electronically detecting the presence of the device within the geographic area defined by the virtual boundary.

In some arrangements, the method further includes (i) electronically detecting, after the irrigation task has been suspended, that the device has exited the geographic area defined by the virtual boundary, and (ii) resuming the irrigation task in response to electronically detecting that the device has exited the geographic area defined by the virtual boundary.

In some arrangements, the method further includes terminating the irrigation task after the set of irrigation heads has irrigated the geographic area for a predefined amount of time.

In some arrangements, terminating the irrigation task includes ending the irrigation task in response to expiration of an irrigation timer constructed and arranged to measure the predefined amount of time, the irrigation timer being (i) started in response to initiating the irrigation task, (ii) paused in response to suspending the irrigation task, and (iii) resumed in response to resuming the irrigation task.

In some arrangements, the set of irrigation heads includes a group of interconnected sprinklers constructed and arranged to water part of a golf course. Additionally, electronically detecting presence of the device within the geographic area defined by the virtual boundary includes receiving a wireless signal indicating that the device has entered the part of the golf course.

In some arrangements, the device includes global positioning system (GPS) circuitry and a wireless transmitter, the wireless transmitter being constructed and arrange to include a current GPS location identified by the GPS circuitry in the wireless signal. Additionally, receiving the wireless signal includes extracting the current GPS location from the wireless signal and comparing the current GPS location to a set of predefined GPS locations to determine that the device has entered the part of the golf course.

In some arrangements, a Bluetooth apparatus is located in the geographic area to define at least part of the virtual boundary. Additionally, one of the device and the Bluetooth apparatus operates as a Bluetooth beacon, and the other of the device and the Bluetooth apparatus operates as a Bluetooth detector. Furthermore, receiving the wireless signal includes receiving an indication that the Bluetooth detector has detected the Bluetooth beacon to determine that the device has entered the part of the golf course.

In some arrangements, the method further includes electronically detecting presence of the device within another geographic area that is outside the virtual boundary. The irrigation task resumes in response to electronically detecting the presence of the device within the other geographic area.

In some arrangements, the method further includes electronically detecting presence of another device within the geographic area defined by the virtual boundary, and continuing to suspend the irrigation task while at least one of the devices remains within the geographic area defined by the virtual boundary.

In some arrangements, initiating the irrigation task includes transitioning a set of control valves from a set of closed positions to a set of opened positions to deliver water from a water source to the geographic area through the set of irrigation heads.

In some arrangements, suspending the irrigation task includes transitioning the set of control valves from the set of opened positions back to the set of closed positions to prevent further delivery of water from the water source to the geographic area through the set of irrigation heads.

Other embodiments are directed to systems, vehicles/craft, apparatus, assemblies, and so on. Some embodiments are directed to various methods, componentry, platforms, and/or electronic environments/settings/infrastructures/etc. which are involved in providing irrigation control via geofencing.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 3 is a block diagram of an example irrigation task repository in accordance with certain embodiments.

DETAILED DESCRIPTION

An improved technique provides irrigation control via geofencing. Such a technique may involve initiating an irrigation task in which a set of irrigation heads operates in a geofenced area (e.g., a geographic area defined by a virtual boundary) and then suspending the irrigation task when a specialized device is detected within the geofenced area (e.g., by a golfer carrying the specialized device onto a hole, by a golf cart with the specialized device onboard driving onto a hole, etc.). Such geofencing may utilize one or more wireless technologies such as the global positioning system (GPS) infrastructure, Bluetooth beaconing, other radio frequency (RF) mechanisms, combinations thereof, and so on. In some arrangements, suspending the irrigation task may involve operating (e.g., closing) a set of valves that controls the flow of water to a particular golf course area (e.g., part of a golf course fairway, part of a putting green, etc.) to prevent interference with various golfer activity. In some arrangements, such a technique involves resuming the irrigation task once the specialized device is no longer within the geofenced area. Moreover, such a technique may involve starting, pausing, and resuming a timer to precisely control irrigation timing, amounts of water, etc. Accordingly, such a technique may provide reliability and flexibility, and may alleviate the need for a large maintenance crew to monitor and apply judgment to control irrigation.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
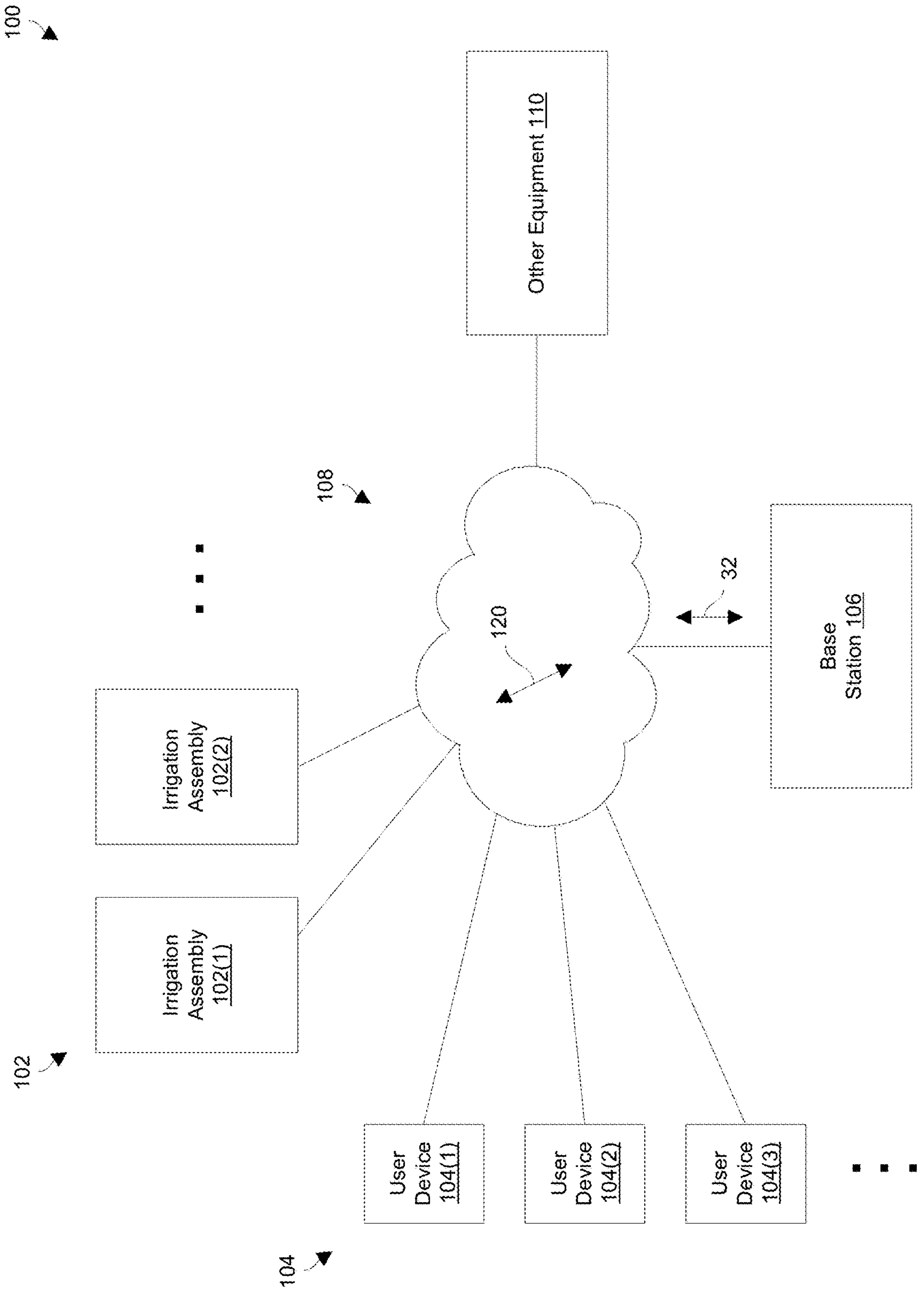
FIG. 1 is a block diagram of an example system that provides irrigation control via geofencing in accordance with certain embodiments.

FIG. 1 is a block diagram of an example system 100 that provides irrigation control via geofencing in accordance with certain embodiments. The system 100 includes irrigation assemblies 102(1), 102(2), . . . (collectively, irrigation assemblies 102), user devices 104(1), 104(2), 104(3), . . . (collectively, user devices 104), a base station 106, a communications medium 108, and perhaps other equipment 110.

In accordance with certain embodiments, the irrigation assemblies 102 are constructed and arranged to individually control irrigation to different geofenced areas. Along these lines, the irrigation assemblies 102 may include respective sets of (i.e., one or more) control valves, sensors, pipes/conduits/splitters/couplings/plenums, risers, irrigation heads, combinations thereof, and so on. Accordingly, the irrigation assemblies 102 are able to deliver water to various geofenced areas independently.

In the context of a golf course, the irrigations assemblies 102 may extend from one or more water sources to different portions of the golf course, e.g., different fairways, greens, tee boxes, practice areas, and so on. Other irrigation environments are suitable as well such as fields, campuses, farm areas, etc.

In accordance with certain embodiments, the user devices 104 are constructed and arranged to accompany human users and to communicate with the base station 106. Accordingly, the base station 106 is able to determine when the human users are within the geofenced areas and then control operation of the irrigation assemblies 102 in a manner that does not interfere with (or avoids) the human users.

To this end, the user devices 104 may include specialized circuitry such as wireless transceivers for wireless communications, location circuitry (e.g., GPS circuitry, Bluetooth circuitry, other RF circuitry, combinations thereof, and the like), and perhaps other circuitry. The wireless transceivers enable the user devices 104 to communicate with the base station 106. The location circuitry enables the current locations of the user devices 104 to be determined. The user devices 104 may include other componentry as well such as power supplies, local input and/or output controls, local communications ports, combinations thereof, and so on.

The user devices 104 may take a variety of different form factors (e.g., pocket sized units, clip on or otherwise attachable units, apps running on mobile devices, black boxes, imbedded or integrated circuitry, etc.). Along these lines, in the context of golf course, the golfers on the course may carry the user devices 104 as they play golf on the golf course. Other golfers may place the user devices 104 in (or on) their pull carts. Yet other golfers may ride in drivable golf carts that have the user device 104 installed thereon, and so on.

In accordance with certain embodiments, the base station 106 is constructed and arranged to serve as an irrigation control center. Along these lines, the base station 106 is able to communicate with the irrigation assemblies 102 to control irrigation operation and with the user devices 104 to identify their various current locations. Accordingly, the base station 106 is able to operate the irrigation assemblies 102 in a manner that does not interfere with human users in the vicinities of the user devices 104. For example, when a user device 104 enters a geofenced area that is currently being irrigated by an irrigation assembly 102, the base station 106 may direct the irrigation assembly 102 to temporarily suspend (or pause) an irrigation operation that has already been started, etc. When the user device 104 leaves the geofenced area (or virtual perimeter), the base station 106 may direct the irrigation assembly 102 to resume the irrigation operation.

The communications medium 108 is constructed and arranged to connect the various components of the system 100 together to enable these components to exchange electronic signals 120 (e.g., see the double arrow 120). At least a portion of the communications medium 108 is illustrated as a cloud to indicate that the communications medium 108 is capable of having a variety of different topologies including backbone, hub-and-spoke, loop, irregular, combinations thereof, and so on. Along these lines, one or more portions of the communications medium 108 may be wireless and involve the use of wireless data communications devices. Additionally, one or more portions of the communications medium 108 may include copper-based data communications devices and cabling, fiber optic devices and cabling, combinations thereof, and the like. Furthermore, the communications medium 108 is capable of supporting LAN-based communications, SAN-based communications, cellular communications, WAN-based communications, distributed infrastructure communications, other topologies and/or wireless networking technologies, combinations thereof, etc.

The other equipment 110 represents other possible componentry of the system 100 such as clients, servers, websites, and so on. For example, the user devices 104 may provide a variety of user services such as alerts/notification, email access, weather information, and so on. In the context of a golf course, the user devices 104 may enable golfers to contact a ranger if there is slow play ahead or an issue with the course, a club house to order food or make reservations, and so on.

During operation, the user devices 104, which are with the golfers on the golf course, identify the current locations of the golfers to the base station 106. Accordingly, the base station 106 is able to determine when the golfers are within the geofenced areas and then control operation of the irrigation assemblies 102 in a manner that does not interfere with the golfers. Accordingly, the golfers do not need to wait for irrigation to be manually shut off in a manner that would slow pace of play. Additionally, the golf course maintenance crew does not need to be heavily staffed and trained to understand where the irrigation heads are located, how long they need to run the irrigation heads without wasting water, and apply estimates as to how much time they have before new groups of golfers reach the particular golf course holes, among other things. Moreover, without the hindrances associated with the earlier-described conventional approach to operating a golf course sprinkler system, the overall user experience is improved. Further details will now be provided with reference to FIG. 2.

Figure 2:
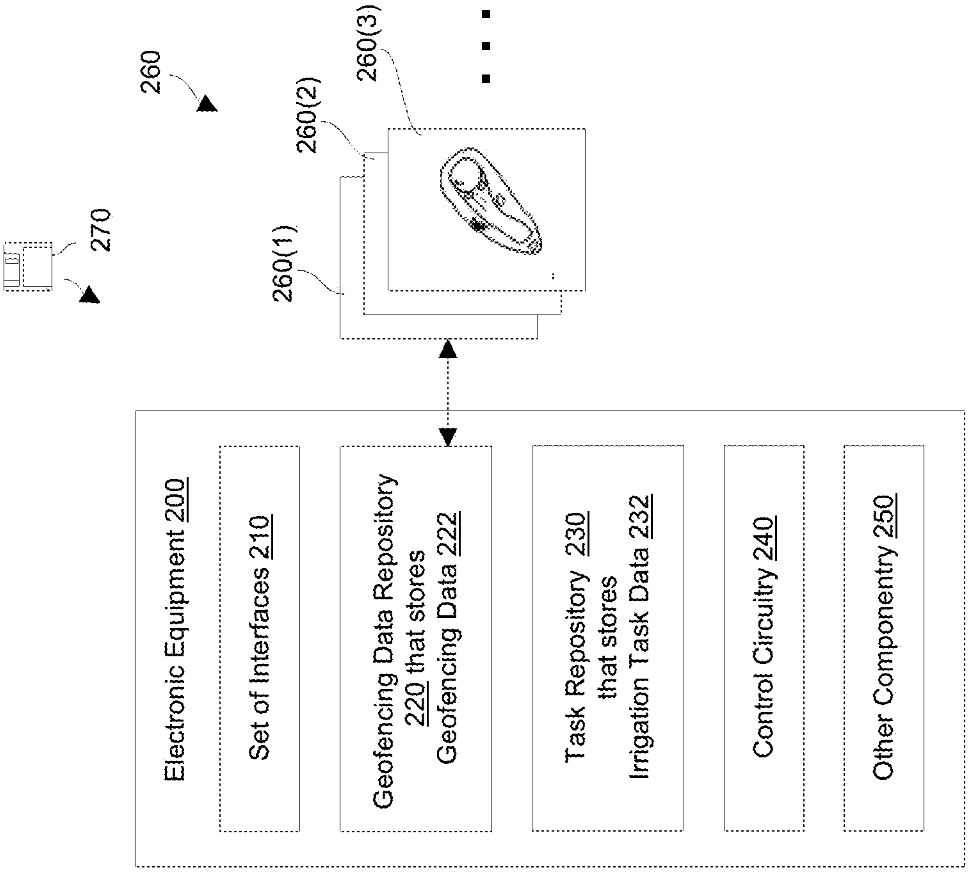
FIG. 2 is a block diagram of example electronic equipment that provides irrigation control via geofencing in accordance with certain embodiments.

FIG. 2 shows example electronic equipment 200 that provides irrigation control via geofencing in accordance with certain embodiments. The electronic equipment 200 is suitable for use as at least part of the system 100 and includes a set of interfaces 210, a geofencing data repository 220 that stores geofencing data 222, a task repository 230 that stores irrigation task data 232, control circuitry 240, and other componentry 250. It should be understood that the electronic equipment 200 may reside within the base station 106 (FIG. 1).

The set of interfaces 210 enables the electronic equipment 200 to communicate with other equipment. Along these lines, the set of interfaces 210 may include one or more network interfaces (e.g., a wireless transceiver, network card, etc.) to enable the electronic equipment 200 to communicate with other devices through the communications medium 108 (also see FIG. 1). The set of interfaces 210 may also include one or more specialized interfaces to provide commands to an irrigation control panel or output control signals to irrigation equipment directly.

The geofencing data repository 220 stores geofencing data 222 for a set of geofenced areas 260(1), 260(2), 260(3), . . . (collectively, geofenced areas 260). Such a geofenced area 260 is a geographic area defined by a virtual boundary or perimeter.

For example, such a geofenced area 260 may be defined by a grid (or an array of cells/coordinates) of adjacent GPS locations. That is, the geofencing data 222 for the geofenced area 260 identifies GPS locations. Some GPS locations may be marked as belonging to the geofenced area 260, and other GPS locations may be marked as not belonging to the geofenced area 260. In this example, a user device 104 may report its current GPS location back to the base station 106.

Then, when a user device 104 moves into a GPS location that is marked as belonging to the geofenced area 260, the base station 106 considers the user device 104 as residing in (or having entered) the geofenced area 260. If the user device 104 moves into another GPS location that is marked as belonging to the geofenced area 260, the base station 106 considers the user device 104 as still residing in the geofenced area 260. However, when the user device 104 moves out of that GPS location and into a GPS location that marked as not belonging to the geofenced area 260, the base station 106 considers the user device 104 as no longer being in (or having exited) the geofenced area 260. This example provides certain advantages such as leveraging use of the publicly available GPS infrastructure (e.g., satellite signals), alleviating the need for specialized Bluetooth circuitry, etc.

As another example, such a geofenced area 260 may be defined by Bluetooth beaconing. That is, the geofencing data 222 for the geofenced area 260 identifies a set of Bluetooth beacons and/or a set of Bluetooth sensors. For example, in some Bluetooth beaconing arrangements, a set of the Bluetooth beacons are distributed around a geographic area and a user device 104 is a Bluetooth sensor. While the user device 104 detects at least one of the Bluetooth beacons, the user device 104 communicates such detection to the base station 106 which then considers the user device 104 as residing in (or having entered) the geofenced area 260. When the user device 104 no longer detects at least one of the Bluetooth beacons (e.g., for a predefined amount of time such as 30 seconds), the user device 104 communicates this situation to the base station 106 which then considers the user device 104 as no longer residing in (or as having exited) the geofenced area 260. This example provides certain advantages such as alleviating the need for specialized GPS circuitry.

As another example, in other Bluetooth beaconing arrangements, a set of the Bluetooth sensors is distributed around a geographic area 260 and a user device 104 operates as a Bluetooth beacon. While the set of Bluetooth sensors detects the user device 104 (i.e., the Bluetooth beacon), the set of Bluetooth sensors communicates such detection to the base station 106 which then considers the user device 104 as residing in (or having entered) the geofenced area 260. When the set of Bluetooth sensors no longer detects the user device 104 (e.g., for a predefined amount of time such as 30 seconds), the set of Bluetooth sensors communicates this situation to the base station 106 which then considers the user device 104 as no longer residing in (or as having exited) the geofenced area 260. Again, this example provides certain advantages such as alleviating the need for specialized GPS circuitry.

It should be understood that other geofencing technologies are suitable for use as well. For example, in some embodiments, geofenced areas may be associated with RF readers, and the user devices 104 include RFID card technology that can be brought close to the RF readers to inform the base station 106 that the user devices 104 are now entering geofenced areas 260. Other embodiment may involve combinations of geofencing technologies (e.g., GPS, Bluetooth beaconing, RF, etc.), and so on.

The task repository 230 stores irrigation task data 232 that defines a set of irrigation tasks. As will be explained in further detail shortly, the irrigation task data 232 includes, for the irrigation tasks, start times, lengths of time, current status (e.g., currently running, currently not running, disabled, etc.), as well as other data.

The control circuitry 240 of the electronic equipment 200 is constructed and arranged to control operation of the irrigation assemblies 102 (FIG. 1) in an automated manner. Such autonomous operation may include determining when a user device 104 has entered a geofenced area 260, initiating/suspending/resuming irrigation tasks defined by the irrigation task data 232, and/or the low level activities of operating the irrigation assemblies 102 (e.g., opening/closing valves, sensing water flow, monitoring irrigation times, etc.).

It should be appreciated that the control circuitry 240 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 270 is capable of delivering all or portions of the specialized software to the electronic equipment 200. In particular, the computer program product 270 includes a non-transitory (or non-volatile) computer readable medium which stores a set of instructions that controls one or more operations of the electronic equipment 200. Examples of suitable computer readable storage media include tangible articles of manufacture and apparatus which store instructions in a non-volatile manner such as DVD, CD-ROM, flash memory, disk memory, tape memory, combinations thereof, and the like.

The other componentry 250 of the electronic equipment 200 refers to additional features/components that may belong to the electronic equipment 200. Along these lines, the electronic equipment 200 may have a set of user input/output (I/O) devices (e.g., a touchscreen, a keyboard, a mouse, a microphone, LEDs, a speaker, etc.), and so on.

As explained above, the electronic equipment 200 may reside within the base station 106. In accordance with some embodiments, the base station 106 operates as a autonomous irrigation control center to manage multiple irrigation assemblies 102 and monitor a fleet of user devices 104.

When the control circuitry 240 of the electronic equipment 200 determines that a user device 104 has entered a particular geofenced area 260, the control circuitry 240 determines whether there is an irrigation assembly 102 that is currently performing an irrigation task in that particular geofenced area 260. If so, the control circuitry 230 directs the irrigation assembly 102 to suspend the irrigation task. Later, when the control circuitry 230 determines that the user device 104 has exited the particular geofenced area 260, the control circuitry 230 directs the irrigation assembly 102 to resume the irrigation task.

It should be appreciated that the system 100 does not need to consider geofenced areas 260 as always “on”. Rather, in accordance with certain embodiments, the system 100 considers a geofenced area 260 as “active” (or present) only when an irrigation task for irrigating that geofenced area 260 has been started. After the irrigation task has been completed, the system 100 considers the geofenced area 260 to be “inactive” (or no longer present).

It should be further appreciated that the base station 106 may provide control to multiple irrigation assemblies 102 simultaneously. For example, the base station 106 may coordinate operation of multiple irrigation assemblies 102 for a golf course at the same time. As another example, the base station 106 may concurrently operate irrigation assemblies 102 for multiple golf courses. Moreover, other irrigation areas are suitable as well such as campuses for corporations, schools, government facilities, parks, sports complexes, residential areas/communities, fields and open spaces, combinations thereof, and so on.

When the electronic equipment 200 forms part of the base station 106, primary control is provided by the based station 106. Nevertheless, in other embodiments, one or more components (or component operations) of the electronic equipment 200 may reside within (or be performed by) the irrigation assemblies 102 or other equipment rather than the base station 106. For example, in some arrangements, the base station 106 performs the high level tasks such as communicating user device location details to a local controller which manages irrigation task operation based on the geofencing data 222, the task data 232, etc. Such local control may handle the lower level activities of initiating, suspending, and resuming irrigation tasks. Further details will now be provided with reference to FIG. 3.

FIG. 3 shows a view 300 of an example task repository 230 (also see FIG. 2) in accordance with certain embodiments. The example task repository 230 includes multiple task repository entries 310(1), 310(2), 310(3), . . . , **310(*n*), . . . (collectively, task repository entries 310). The task repository entries 310 include various fields 320 such as task identifier fields 322, task description fields 324, geofenced area fields 326, start time fields 328, irrigation length (or time) fields 330, current status fields 332, remaining irrigation time fields 334, and other fields 336**.

The task identifier fields 322 of the task repository entries 310 hold task identifiers that uniquely identify particular irrigation tasks. The task description fields 324 hold description information that describes the particular irrigation tasks. The geofenced area fields 326 hold geofence identifiers that identify irrigation assemblies 102 deployed for (or installed within) particular geofenced areas 260 to be irrigated by the particular irrigation tasks. The start time fields 328 hold start times for the particular irrigation tasks. The irrigation length fields 330 hold irrigation times for the particular irrigation tasks (i.e., total amounts/lengths of time that the irrigation assemblies 102 should irrigate). The current status fields 332 hold current status for the particular irrigation tasks (e.g., ready to begin, running, suspended, completed, faulted, off, etc.). The remaining irrigation time fields 334 hold remaining irrigation times for the particular irrigation tasks (i.e., remaining amounts of time that the irrigation assemblies 102 should irrigate). The other fields 336 is suitable for holding other or additional information such as certain days of the week that the irrigation tasks should run and/or not run, the last time the irrigation task was performed, a count of how many times the irrigation task was suspended before being completed, etc.

By way of example, the irrigation task data 232 stored within the task repository 230 is for a golf course. Accordingly, the entries 310 define different irrigation tasks that vary by time of day, golf course location, etc.

For example, the irrigation task entry 310(1) defines a first irrigation task which is uniquely identified by irrigation task identifier "001". This first irrigation task is for irrigating a fairway for Hole #1 of the golf course which is within a geofenced area A. This first irrigation task is scheduled to routinely start at 10:00 AM and last 20 minutes. According to the current status field 332 of the irrigation task entry 310(1), the irrigation task has completed. That is, the control circuitry 240 of the electronic equipment 200 (FIG. 2) has already controlled an irrigation assembly 102 for the fairway for Hole #1 to irrigate the fairway for Hole #1 for 20 minutes based on the entry 310(1).

As another example, the irrigation task entry 310(2) defines a second irrigation task which is uniquely identified by irrigation task identifier "002". This second irrigation task is for irrigating the same fairway for Hole #1 which is within the geofenced area A. This second irrigation task is scheduled to routinely start at 2:00 PM and last 15 minutes. According to the current status field 332 of the irrigation task entry 310(2), the irrigation task is currently running (or in progress). That is, the control circuitry 240 of the electronic equipment 200 (FIG. 2) is currently running the irrigation assembly 102 for the fairway for Hole #1 to irrigate the fairway for Hole #1 for 15 minutes based on the entry 310(2).

As yet another example, the irrigation task entry **310(*n*) defines another irrigation task which is uniquely identified by irrigation task identifier "011". This irrigation task is for irrigating a back portion of a fairway for Hole #2 which is within a geofenced area X. This irrigation task is scheduled to routinely start at 2:00 PM and last 15 minutes. According to the current status field 332 of the irrigation task entry 310(*n*), the irrigation task is currently suspended perhaps due to a golfer with a user device 106 having entered the geofenced area X. As a result, the irrigation task is temporarily paused (e.g., irrigation through the irrigation assembly 102 that is currently controlled by the irrigation task entry 310(*n*) is put on hold until the golfer with the user device 106** exits the geofenced area X).

It should be understood that the irrigation task data 232 stored within the task repository 230 is capable of including multiple and different irrigation task entries 310 for the same location. Along these lines, the entries 310(1), 310(2), and 310(3) define irrigation tasks for the same location (e.g., the fairway for Hole #1) but at different times of the day.

It should be further understood that the irrigation task entries 310 may define multiple and different irrigation task entries 310 for the same time. For example, the entries 310(2) and **310(*n*) define irrigation tasks for different locations (i.e., different irrigation assemblies 102**) that start at 2:00 PM during the day.

Other variations, combinations, and/or setups are suitable for use as well. For example, different irrigation assemblies 102 may be controlled independently within the same geofenced area based on different irrigation task entries 210, certain irrigation task entries 210 may be configured to run only on certain days, the irrigation times may be automatically adjusted based on weather conditions, and so on. Further details will now be provided with reference to FIGS. 4 through 6.

Figure 4:
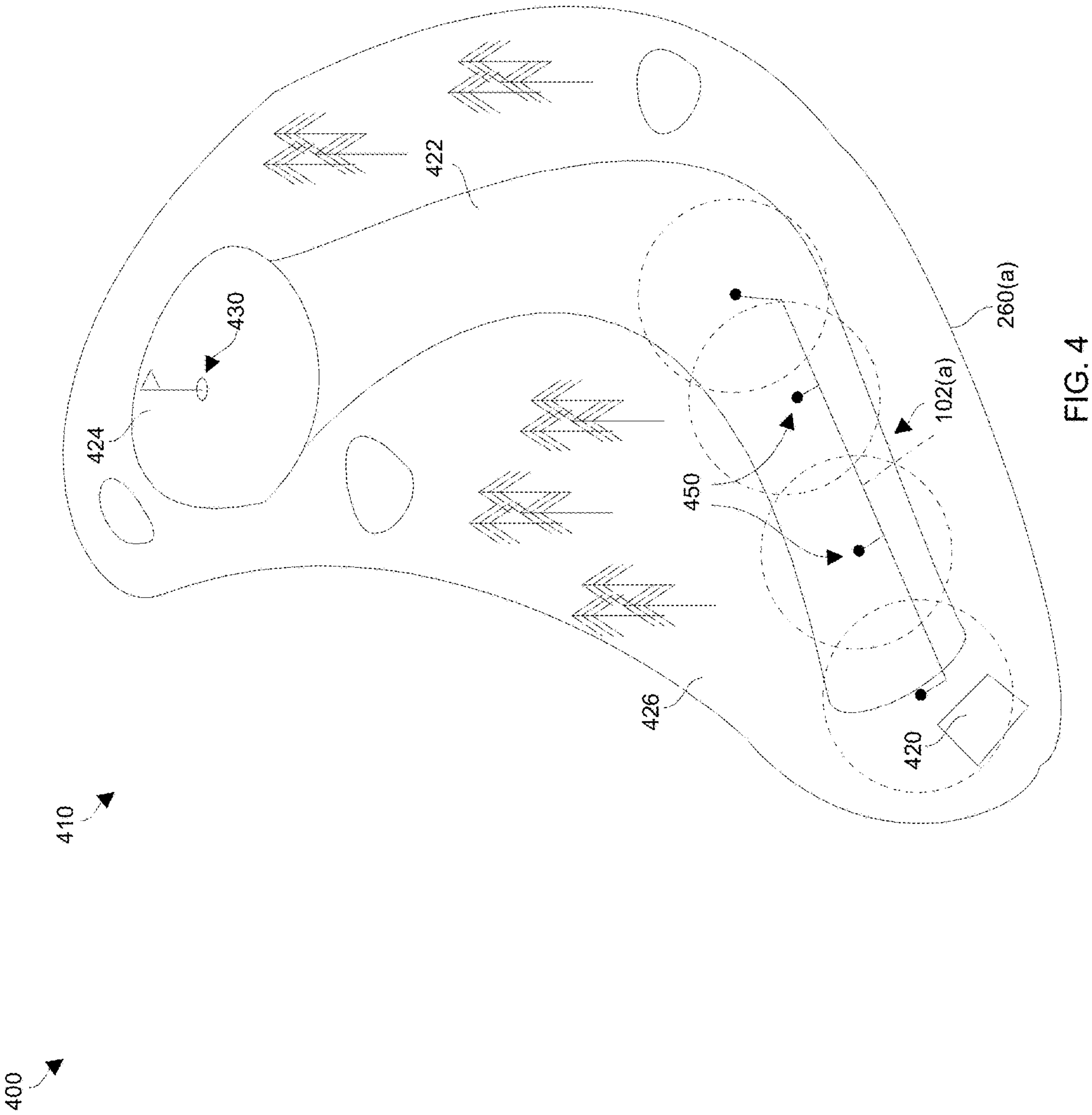
FIG. 4 is a diagram of an example environment that utilizes the system of FIG. 1 in accordance with certain embodiments.
Figure 5:
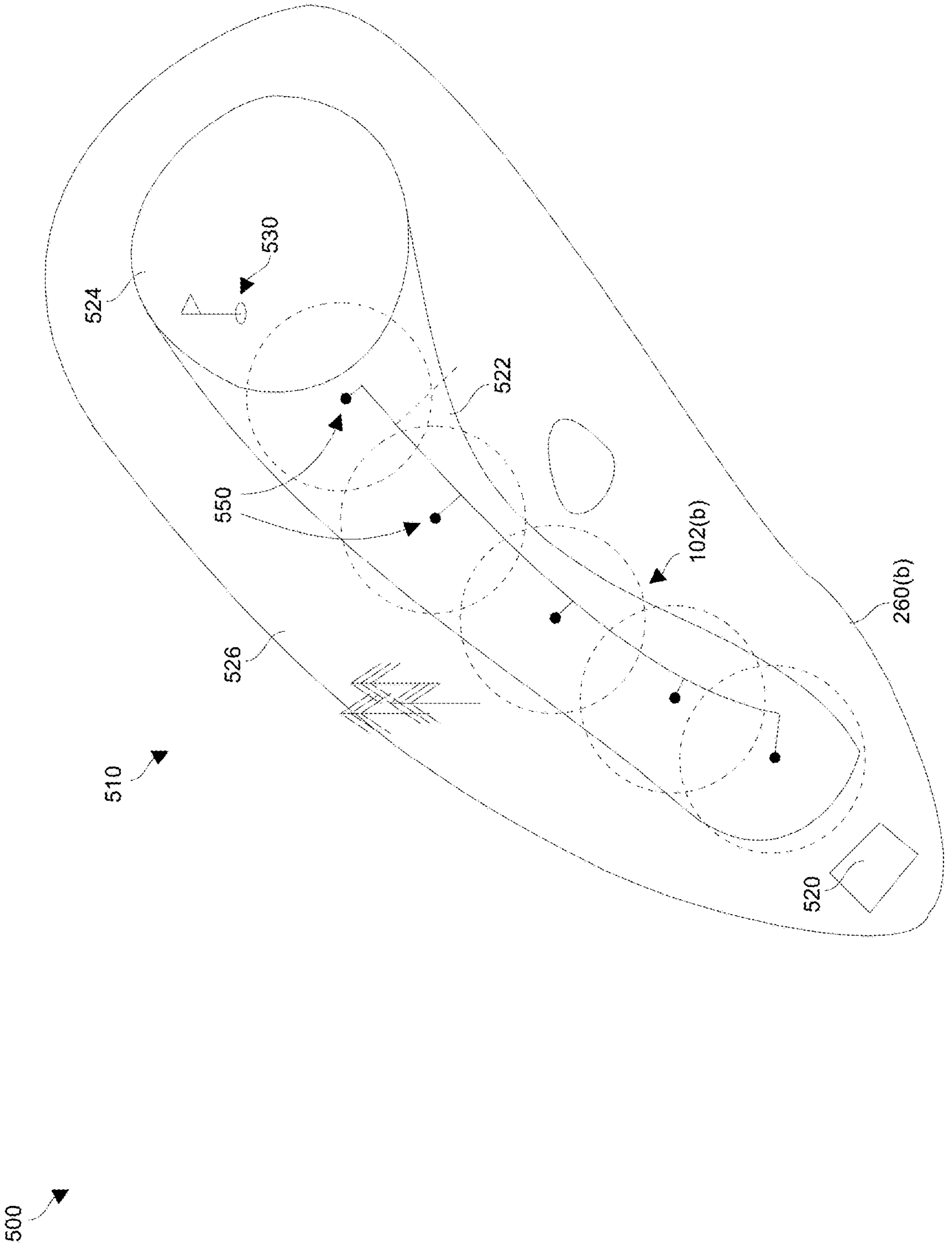
FIG. 5 is block diagram of another example environment that utilizes the system of FIG. 1 at a first operating time in accordance with certain embodiments.
Figure 6:
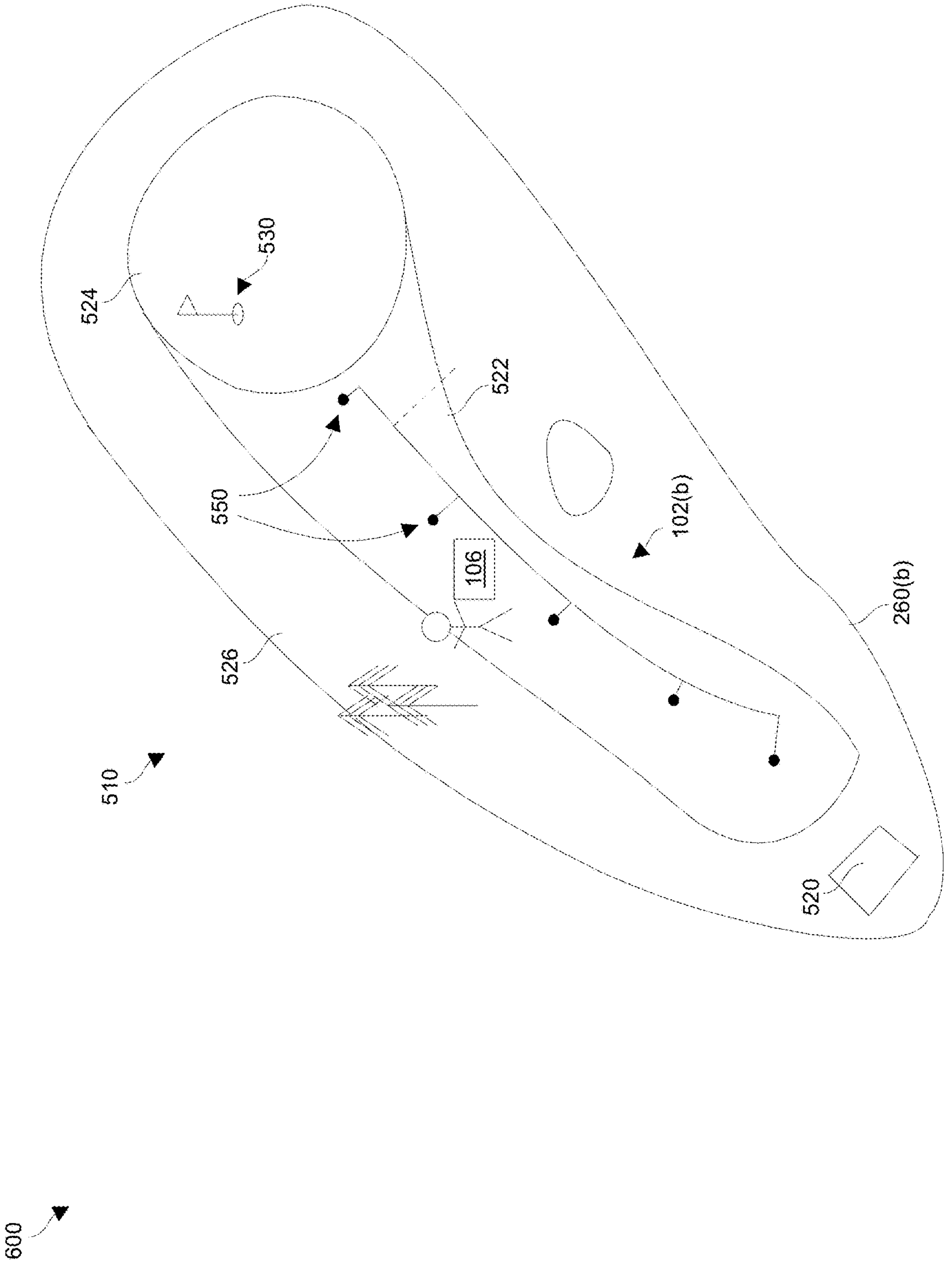
FIG. 6 is block diagram of the other example environment that utilizes the system of FIG. 1 at a second operating time in accordance with certain embodiments.

FIGS. 4 through 6 are diagrams of example environments that utilize the system 100 for irrigation (also see FIG. 1). FIG. 4 is a view 400 of a hole of a golf course. FIG. 5 is a view 500 of another hole of the golf course when no user devices are within a geofenced area that extends over the hole. FIG. 6 is a view 600 of the other hole of the golf course when a user device is within the geofenced area that extends over the hole.

As shown in the view 400 of FIG. 4, the example environment includes a particular golf course hole 410 having various sections such as a tee box 420, a fairway 422, a green 424, and a rough 426. The hole 410 may include one or more other sections as well (e.g., ponds, marshes, rocky outcroppings, waste areas, etc.). Within the various sections, there may be various sub-regions and/or locations 430 such as a pin location, an apron around the green, sand traps, ponds, treed regions, steep inclines, cart paths, rocky areas, grounds under repair, mulch beds, sprinkler heads, yardage markers, and so on.

The geofencing data 222 within the geofencing repository 220 (FIG. 2) may define one or more geofenced areas 260 for the hole 410. Along these lines, suppose that the geofencing data 222 defines a geofenced area **260(*a*) that includes all of the various sections of the hole 410 (e.g., the tee box 420, the fairway 422, the green 424, and the rough 426**).

Additionally, the irrigation task data 232 within the task repository 230 (FIG. 3) may include a set of irrigation task entries 310 for irrigating the hole 410. Along these lines, suppose that a particular irrigation task entry 310 defines an irrigation task that controls an irrigation assembly 102(*a*) (also see FIG. 1) that includes a set of irrigation heads 450 (one or more heads 450) to deliver water to at least a portion of the hole 410. The dashed circles around the irrigation heads 450 are intended to illustrate the water delivery range (or reach) of the irrigation heads 450.

By way of example and as shown in the view 400 of FIG. 4, a particular irrigation assembly 102 includes irrigation heads 450 for irrigating the tee box and a front portion of the fairway of the hole 410. Other configurations/watering patterns/topologies/etc. are suitable as well. Moreover, one or more other irrigation assemblies 102 may reside within the geofenced area 260(*a*) to irrigate other portions of the hole 410 (e.g., the back portion of the fairway 422, the green 424, etc.).

As shown in the view 500 of FIG. 5, another example environment includes another golf course hole 510 having various sections such as a tee box 520, a fairway 522, a green 524, and a rough 526. Again, the hole 510 may include one or more other sections as well (e.g., ponds, marshes, rocky outcroppings, waste areas, etc.). Within the various sections, there may be various sub-regions and/or locations 530 such as a pin location, an apron around the green, sand traps, ponds, treed regions, steep inclines, cart paths, rocky areas, grounds under repair, mulch beds, sprinkler heads, yardage markers, and so on.

The geofencing data 222 within the geofencing repository 220 (FIG. 2) may define one or more geofenced areas 260 for the hole 410. Along these lines, suppose that the geofencing data 222 defines a geofenced area 260(*b*) that includes the majority of the fairway for the hole 510.

Additionally, the irrigation task data 232 within the task repository 230 (FIG. 3) may include a set of irrigation task entries 310 for irrigating the hole 510. Along these lines, suppose that a particular irrigation task entry 310 defines an irrigation task that controls an irrigation assembly 102(*b*) (also see FIG. 1) that includes a set of irrigation heads 550 (one or more heads 550) to deliver water to at least a portion of the hole 510. Again, the dashed circles around the irrigation heads 550 are intended to illustrate the water delivery range (or reach) of the irrigation heads 550. As mentioned earlier in connection with FIG. 4, other configurations/watering patterns/topologies/etc. are suitable as well. Moreover, one or more other irrigation assemblies 102 may reside within the geofenced area 260(*b*) to irrigate other portions of the hole 510 (e.g., the tee box 520, the green 524, etc.).

During operation and with reference to FIG. 5, suppose that the system 100 begins an irrigation task based on an irrigation task entry 310 in the task repository 230 (also see FIGS. 2 and 3) to irrigate the hole 510 using the irrigation assembly 102(*b*). At the start of irrigation for the irrigation task entry 310 (FIG. 3), the system 100 activates the geofenced area 260(*b*) and begins monitoring the irrigation time (e.g., see the various time related fields 328, 330, and 334 in the entries 310 in FIG. 3). Along these lines, the system 100 may start a timer (or counter) to ascertain how much time remains for the irrigation task. Additionally, the system 100 senses whether any golfers with user devices 104 have entered the geofenced area 260(*b*) identified in the entry 310 (e.g., see the geofenced area fields 326 in the entries 310 in FIG. 3).

If there are no user devices 104 within the geofenced area 260(*b*), the system 100 operates a set of valves that controls water delivery through the set of irrigation heads 550 to irrigate the fairway 522 of the hole 510. Accordingly, as shown in FIG. 5, the set of irrigation heads 550 delivers water to the fairway 522.

Next, suppose that a golfer with a user device 106 enters the geofenced area 260(*b*). When the system 100 detects that the user device 106 is now in the geofenced area 260(*b*), the system 100 suspends the irrigation task. In particular, the system 100 operates the set of valves to prevent further water delivery through the set of irrigation heads 550, and pauses the timer. In the view 600 of FIG. 6, the golfer with the user device 106 is within the geofenced area 260(*b*) and the irrigation task is suspended (e.g., there are no dashed circles in the view 600 depicting water delivery through the set of irrigation heads 550). The system 100 maintains suspension of the irrigation task until the system 100 determines that the golfer with the user device 106 has exited the geofenced area 260(*b*).

Once the golfer with the user device 106 has left the geofenced area 260(*b*), the system 100 resumes the irrigation task. Along these lines, the system 100 operates the set of valves to again deliver water through the set of irrigation heads 550, and resumes the timer so that the irrigation may continue for the allotted amount of time (e.g., see the remaining irrigation time field 334 in the entries 310 in FIG. 3). Such operation improves the user experience as well as avoids wasting water.

In some arrangements, the system 100 waits a short amount of time (e.g., 30 seconds, a minute, etc.) after the golfer with the user device 106 leaves the geofenced area 260(*b*) before resuming the irrigation task. Such operation, prevents the irrigation task from being switched quickly back and forth between the paused and resumed states due to certain events such as when the golfer with the user device 106 is moving in and out of the geofenced area 260(*b*) (e.g., searching for a ball around a perimeter of the geofenced area 260(*b*)).

In some arrangements, the system 100 waits until the golfer with the user device 106 reaches the geofenced area 260 for another hole before resuming the irrigation task. Such operation improves the golfer experience by pausing the irrigation task until the golfer is no longer involved with the current geofenced area 260(*b*)).

It should be understood that the system 100 will maintain suspension of an irrigation task as long as there is at least one user device 106 detected within the geofenced area 260(*b*). Along these lines, a first golfer with a first user device 106 may enter the geofenced area 260(*b*) followed by a second golfer with a second user device 106, and so on. In such a situation, the system 100 waits until there are no user devices 106 within the geofenced area 260(*b*) before resuming the irrigation task.

It should be further understood that the timer may be implemented in a variety of ways. In accordance with certain embodiments, the timer includes a counter (or clock) that increments or decrements until the total amount of time for the irrigation task (e.g., the irrigation length) has expired. In accordance with certain embodiments, the timer is implemented by aggregating amounts of time based on timestamp arithmetic (e.g., tallying differences between current times and timestamps of when the irrigation task is paused). Other timer mechanisms are suitable for use as well. Further details will now be provided with reference to FIG. 7.

Figure 7:
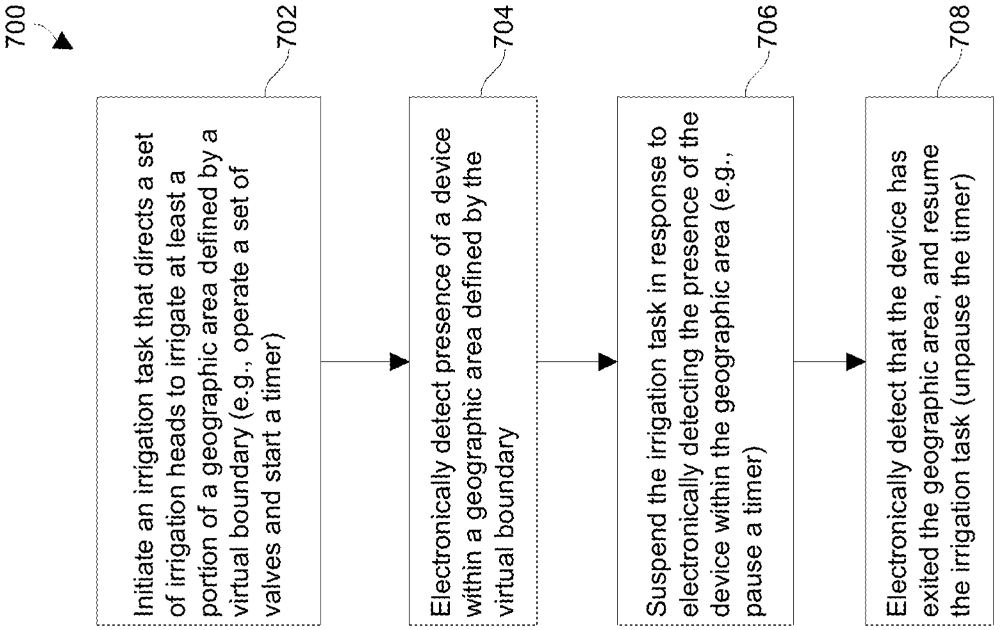
FIG. 7 is a flowchart of a procedure for providing irrigation control via geofencing in accordance with certain embodiments.

FIG. 7 is a flowchart of a procedure 700 for controlling a set of irrigation heads (or generally the irrigation assemblies 102 themselves) in accordance with certain embodiments. Such a procedure 700 may be performed by specialized circuitry (e.g., see the electronic equipment 200 in FIG. 2).

At 702, the specialized circuitry initiates an irrigation task that directs the set of irrigation heads to irrigate at least a portion of a geographic area defined by a virtual boundary. Here, the specialized circuitry may operate a set of irrigation valves to deliver water through the set of irrigation heads and start a timer to monitor an amount of time for the irrigation task.

At 704, the specialized circuitry electronically detects presence of a device within the geographic area defined by the virtual boundary. Detection of such a device may use GPS technology, Bluetooth technology, other RF mechanisms, combinations thereof, etc.

At 706, the specialized circuitry suspends the irrigation task in response to electronically detecting the presence of the device within the geographic area defined by the virtual boundary. Here, the specialized circuitry may pause a timer that tracks the amount of time for the irrigation task.

At 708, the specialized circuitry, after the irrigation task has been suspended, electronically detects that the device has exited the geographic area defined by the virtual boundary. Additionally, the specialized circuitry resumes the irrigation task in response to electronically detecting that the device has exited the geographic area defined by the virtual boundary.

It should be understood that the above-described system 100 for providing irrigation control may take the form of a single control circuit in which that control circuit performs all of the various operations. However, some of these operations may be performed by different circuits/devices/equipment/etc. and/or at different locations.

Figure 8:
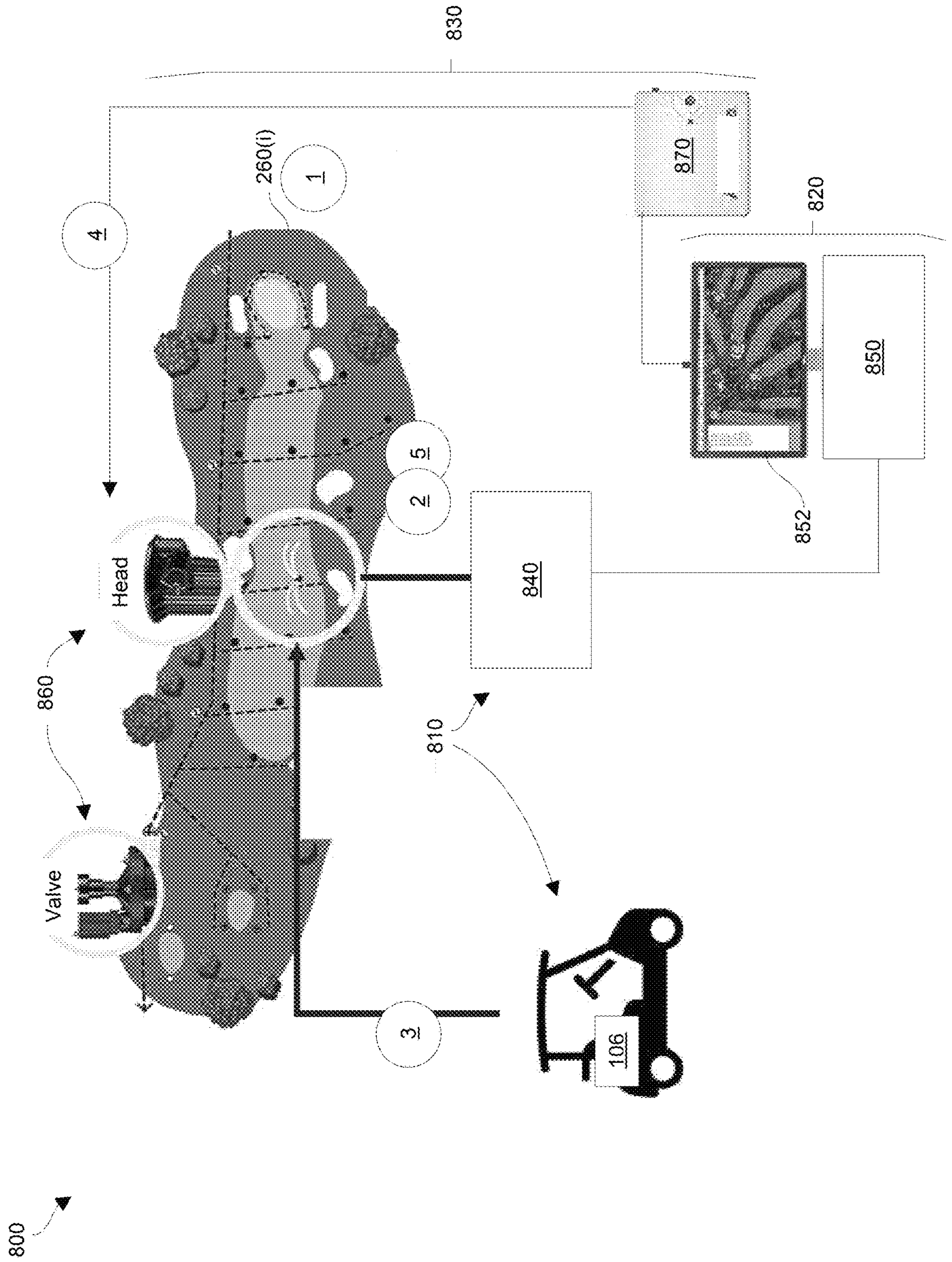
FIG. 8 is a block diagram of an example modularized configuration for a system that provides irrigation control via geofencing in accordance with certain embodiments.

FIG. 8 shows a modularized configuration 800 for various equipment of the system 100 in accordance with certain embodiments. Here, the system 100 includes a geofencing subsystem 810, a central control subsystem 820, and an irrigation subsystem 830.

The geofencing subsystem 810 includes (i) the earlier-mentioned user devices 104 that are with users (e.g., carried by walking golfers, installed on golf carts, etc.) (also see FIG. 1) and (ii) specialized circuitry 840 that monitors the user devices 104 and communicates with the central control subsystem 820. Accordingly, the geofencing subsystem 810 is able to identify current locations of the user devices 106 to the central control subsystem 820.

The central control subsystem 820 includes control circuitry 850 which is constructed and arranged to receive the current locations of the user devices 106 from the geofencing subsystem 810 and determine when the users with the user devices 106 have entered/exited the geofenced areas 260 (e.g., also see FIG. 2). Additionally, the central control subsystem 820 is constructed and arranged to send irrigation control commands to the irrigation subsystem 830 based on this input from the geofencing subsystem 810.

In some arrangements, the central control subsystem 820 is equipped with a user interface 852. The user interface 852 may take the form of a graphical user interface (GUI) or the like and enable a human administrator to create/modify geofenced areas 260, create/modify irrigation tasks for irrigating an environment such as a golf course, and so on (also see FIGS. 2 and 3).

The irrigation subsystem 830 includes irrigation equipment 860 (e.g., valves, irrigation heads, etc.) and an irrigation interface 870 to communicate with the central control subsystem 820. Accordingly, the irrigation subsystem 830 is able to respond to the commands from the central control subsystem 820.

During operation and as shown in FIG. 8, the central control subsystem 820 manages irrigation tasks based on the irrigation task data 232 in the task repository 230 (also see FIG. 2). For example, the central control subsystem 820 may initiate an irrigation task to irrigate a geofenced area 260(*i*) in response to reaching a particular start time for an irrigation task defined by a particular irrigation task entry 310 (FIG. 3).

When the central control subsystem 820 begins an irrigation task to irrigate the geofenced area 260(*i*) in accordance with an irrigation task entry 310, the central control subsystem 820 activates a geofenced area (or geofence) 260 for that location active (circle #1 in FIG. 8). Here, the central control equipment 810 determines whether there are any user devices 106 within the geofenced area 260 based on input from the geofencing subsystem 810. If there is at least one user device 106 within the geofenced area 260, the central control subsystem 820 delays directing the irrigation system 830 to operate a set of valves to deliver water through a set of irrigation heads to the location until all of the user devices 106 have exited the geofenced area 260.

When there are no user devices 106 within the geofenced area 260, the central control subsystem 820 directs the irrigation system 830 (e.g., via a first set of commands) to operate the set of valves to deliver water through a set of irrigation heads to the location (circle #2). Additionally, the central control subsystem 820 begins measuring the amount of time that the irrigation task is running.

Next, suppose that the central control subsystem 820 detects that a golfer with a user device 106 enters the geofenced area 260(*i*) (circle #3). In response, the central control subsystem 820 directs the irrigation subsystem 830 (e.g., via another set of commands) to operate the set of valves to prevent delivery of water through the set of irrigation heads to the geofenced area 260(*i*) (circle #4). At this time, the irrigation is considered paused by the central control equipment 810.

When the geofenced area 260(*i*) is clear of the golfer with the user device 106, the central control subsystem 820 directs the irrigation subsystem 830 (e.g., via yet another set of commands) to resume the irrigation task by operating the set of valves to again deliver water through the set of irrigation heads to the geofenced area 260(*i*) (circle #5) and to resume the timer. Here, irrigation is considered resumed by the central control subsystem 820.

As described above, improved techniques are directed to providing irrigation control via geofencing. Such techniques may involve initiating an irrigation task in which a set of irrigation heads operates in a geofenced area 260 (e.g., a geographic area defined by a virtual boundary) and then suspending the irrigation task when a specialized device 106 is detected within the geofenced area 260 (e.g., by a golfer carrying the specialized device, by a golf cart with the specialized device onboard, etc.). Such geofencing may utilize one or more wireless technologies such as the global positioning system (GPS) infrastructure, Bluetooth beaconing, other radio frequency (RF) mechanisms, combinations thereof, and so on. In some arrangements, suspending the irrigation task may involve closing a set of valves that delivers water to a particular golf course area (e.g., part of a golf course fairway, part of a putting green, etc.) to prevent interference with various golfer activity. In some arrangements, such techniques involve resuming the irrigation task once there no specialized devices 106 still within the geofenced area. Moreover, such techniques may start, pause, and resume timers to precisely control irrigation without wasting water. Accordingly, such techniques provide reliability and flexibility, as well as alleviate the need for a large maintenance crew to monitor and apply judgment over irrigation.

One should appreciate that the above-described techniques do not merely provide automated irrigation operation to replace a human. Rather, the disclosed techniques provide certain advantages and/or benefits. Along these lines, a human operating a set of irrigation heads may not be able to see (e.g., due to focusing on multiple people), but the techniques disclosed herein provide reliable detection thus improving the user experience. Additionally, a human operating a set of irrigation heads may not always know when to resume irrigation, but the techniques disclosed herein provide reliability, consistency, and so on. Also, such irrigation may be performed during the daytime without interfering with the normal course of play.

Furthermore, it should be understood that the irrigation control disclosed herein may leverage certain automation technologies to control irrigation. As a result, the operation of the set of irrigation heads may be primarily under computerized control (e.g., carried out by one or more machines/computers without the need of human participation and/or intervention).

While various embodiments of the present disclosure have been particularly shown and described, it will be understood by those skilled in the art that various changes in form and details may be made therein without departing from the spirit and scope of the present disclosure as defined by the appended claims.

It should be understood that, from certain perspectives, a common occurrence on golf courses, especially in the afternoon during summer, is a golf course superintendent and his crew running irrigation to prevent turf from drying and wilting. This requires running irrigation during the course of play. Often times this results is golfers attempting to avoid active irrigation heads as they proceed to play the hole resulting is slower pace of play and frustration from the golfer.

In accordance with certain embodiments, specialized equipment coordinates golfer proximity to the active irrigation and temporarily disables a set of active irrigation heads while golfers are within a certain proximity. After the golfers leave the proximity, the irrigation can continue to run for its schedule time.

Certain embodiments integrate of a wireless location monitoring system with an irrigation system such as that used on a golf course. Here, the wireless location monitoring system may tracks location of golf fleet vehicles and walking golfers using golfing applications (or apps).

Each set of irrigation heads on the golf course has a conditional geofence placed beyond the perimeter of the throw of the irrigation head. The geofence only becomes active when the irrigation head is active. When a fleet vehicle or a walker enters the irrigation geofence while the geofence is active, the geofence system sends a trigger to the irrigation system to temporarily disable the set of irrigation heads. When the irrigation is disabled any timer set for the irrigation will be paused until the irrigation becomes active (e.g., by resuming irrigation when there are no fleet vehicles or walkers remaining within the geofence). That is, as golfers leave the proximity of the irrigation head and exit the geofenced, a remote signal will be sent to the irrigation system to notify the set of irrigation heads to resume.

It should be appreciated that the irrigation environment was described as a golf course by way of example only. Other environments are suitable as well such as those in the agricultural industry and commercial mowing industry. For such other environments, the user devices 104 may be configured to identify current locations of other types of users (e.g., lawn mowers, utility vehicles, specialized equipment, etc.). Such modifications and enhancements are intended to belong to various embodiments of the disclosure.

What is claimed is:

1. A method of controlling a set of irrigation heads, the method comprising:

initiating an irrigation task that directs the set of irrigation heads to irrigate at least a portion of a geographic area defined by a virtual boundary;

electronically detecting presence of a device within the geographic area defined by the virtual boundary; and suspending the irrigation task in response to electronically detecting the presence of the device within the geographic area defined by the virtual boundary;

wherein initiating the irrigation task includes:

transitioning a set of control valves from a set of closed positions to a set of opened positions to deliver water from a water source to the geographic area through the set of irrigation heads; and transitioning a geofence comparison service from an inactive state to an active state to monitor for the presence of the device within the virtual boundary.

2. The method of claim 1, further comprising:

after the irrigation task has been suspended, electronically detecting that the device has exited the geographic area defined by the virtual boundary; and resuming the irrigation task in response to electronically detecting that the device has exited the geographic area defined by the virtual boundary.

3. The method of claim 2, further comprising:

terminating the irrigation task after the set of irrigation heads has irrigated the geographic area for a predefined amount of time.

4. The method of claim 3 wherein terminating the irrigation task includes:

ending the irrigation task in response to expiration of an irrigation timer constructed and arranged to measure the predefined amount of time, the irrigation timer being (i) started in response to initiating the irrigation task, (ii) paused in response to suspending the irrigation task, and (iii) resumed in response to resuming the irrigation task.

5. The method of claim 1 wherein the set of irrigation heads includes a group of interconnected sprinklers constructed and arranged to water part of a golf course; and wherein electronically detecting presence of the device within the geographic area defined by the virtual boundary includes:

receiving a wireless signal indicating that the device has entered the part of the golf course.

6. The method of claim 5 wherein the device includes global positioning system (GPS) circuitry and a wireless transmitter, the wireless transmitter being constructed and arrange to include a current GPS location identified by the GPS circuitry in the wireless signal; and wherein receiving the wireless signal includes:

extracting the current GPS location from the wireless signal and comparing the current GPS location to a set of predefined GPS locations to determine that the device has entered the part of the golf course.

7. The method of claim 5 wherein a Bluetooth apparatus is located in the geographic area to define at least part of the virtual boundary;

wherein one of the device and the Bluetooth apparatus operates as a Bluetooth beacon, and the other of the device and the Bluetooth apparatus operates as a Bluetooth detector; and wherein receiving the wireless signal includes:

receiving an indication that the Bluetooth detector has detected the Bluetooth beacon to determine that the device has entered the part of the golf course.

8. The method of claim 1, further comprising:

electronically detecting presence of the device within another geographic area that is outside the virtual boundary, the irrigation task resuming in response to electronically detecting the presence of the device within the other geographic area.

9. The method of claim 1, further comprising:

electronically detecting presence of another device within the geographic area defined by the virtual boundary; and continuing to suspend the irrigation task while at least one of the devices remains within the geographic area defined by the virtual boundary.

10. The method of claim 1 wherein suspending the irrigation task includes:

transitioning the set of control valves from the set of opened positions back to the set of closed positions to prevent further delivery of water from the water source to the geographic area through the set of irrigation heads.

11. The method of claim 1, wherein a base station is constructed and arranged to electronically control operation of the set of irrigation heads via a set of remote signals; and wherein suspending the irrigation task includes:

providing a remote signal from the base station to circuitry controlling the set of irrigation heads to prevent delivery of water from the set of irrigation heads.

12. Electronic circuitry to control a set of irrigation heads, the electronic circuitry comprising:

an interface;

a controller coupled with the interface, the controller being constructed and arranged to perform a method of:

initiating, through the interface, an irrigation task that directs the set of irrigation heads to irrigate at least a portion of a geographic area defined by a virtual boundary;

electronically detecting, through the interface, presence of a device within the geographic area defined by the virtual boundary; and suspending, through the interface, the irrigation task in response to electronically detecting the presence of the device within the geographic area defined by the virtual boundary;

wherein initiating the irrigation task includes:

transitioning a set of control valves from a set of closed positions to a set of opened positions to deliver water from a water source to the geographic area through the set of irrigation heads; and transitioning a geofence comparison service from an inactive state to an active state to monitor for the presence of the device within the virtual boundary.

13. The electronic circuitry of claim 12 wherein the method further comprises:

after the irrigation task has been suspended, electronically detecting that the device has exited the geographic area defined by the virtual boundary; and resuming the irrigation task in response to electronically detecting that the device has exited the geographic area defined by the virtual boundary.

14. The electronic circuitry of claim 13 wherein the method further comprises:

terminating the irrigation task after the set of irrigation heads has irrigated the geographic area for a predefined amount of time.

15. The electronic circuitry of claim 14 wherein terminating the irrigation task includes:

ending the irrigation task in response to expiration of an irrigation timer constructed and arranged to measure the predefined amount of time, the irrigation timer being (i) started in response to initiating the irrigation task, (ii) paused in response to suspending the irrigation task, and (iii) resumed in response to resuming the irrigation task.

16. The electronic circuitry of claim 15 wherein the set of irrigation heads includes a group of interconnected sprinklers constructed and arranged to water part of a golf course; and wherein electronically detecting presence of the device within the geographic area defined by the virtual boundary includes:

receiving a wireless signal indicating that the device has entered the part of the golf course.

17. The electronic circuitry of claim 15 wherein the method further comprises:

electronically detecting presence of the device within another geographic area that is outside the virtual boundary, the irrigation task resuming in response to electronically detecting the presence of the device within the other geographic area.

18. The electronic circuitry of claim 15 wherein the method further comprises:

electronically detecting presence of another device within the geographic area defined by the virtual boundary; and continuing to suspend the irrigation task while there is at least one of the devices within the geographic area defined by the virtual boundary.

19. The electronic circuitry of claim 12 wherein suspending the irrigation task includes:

transitioning the set of control valves from the set of opened positions to the set of closed positions to pause delivery of water to the geographic area through the set of irrigation heads; and maintaining the geofence comparison service in the active state to electronically detect whether the device has exited the geographic area defined by the virtual boundary.

20. The electronic circuitry of claim 19 wherein the method further includes:

receiving an indication from the geofence comparison service that the device has exited the geographic area defined by the virtual boundary;

in response to receiving the indication, temporarily transitioning the set of control valves from the set of closed positions to the set of opened positions to complete delivery of water from the water source to the geographic area through the set of irrigation heads; and after temporarily transitioning the set of control valves from the set of closed positions to the set of opened positions, transitioning the geofence comparison service from the active state to the inactive state to end monitoring for the presence of the device within the virtual boundary.

21. A computer program product having a non-transitory computer readable medium which controls a set of irrigation heads; the set of instructions, when carried out by computerized circuitry, causing the computerized circuitry to perform a method of:

initiating an irrigation task that directs the set of irrigation heads to irrigate at least a portion of a geographic area defined by a virtual boundary;

electronically detecting presence of a device within the geographic area defined by the virtual boundary; and suspending the irrigation task in response to electronically detecting the presence of the device within the geographic area defined by the virtual boundary;

wherein initiating the irrigation task includes:

transitioning a set of control valves from a set of closed positions to a set of opened positions to deliver water from a water source to the geographic area through the set of irrigation heads; and transitioning a geofence comparison service from an inactive state to an active state to monitor for the presence of the device within the virtual boundary.

* * * * *